No. 699,190. Patented May 6, 1902.
W. C. KINCAID.
SPREADER FOR FENCE MAKING MACHINES.
(Application filed Sept. 30, 1901.)
(No Model.)
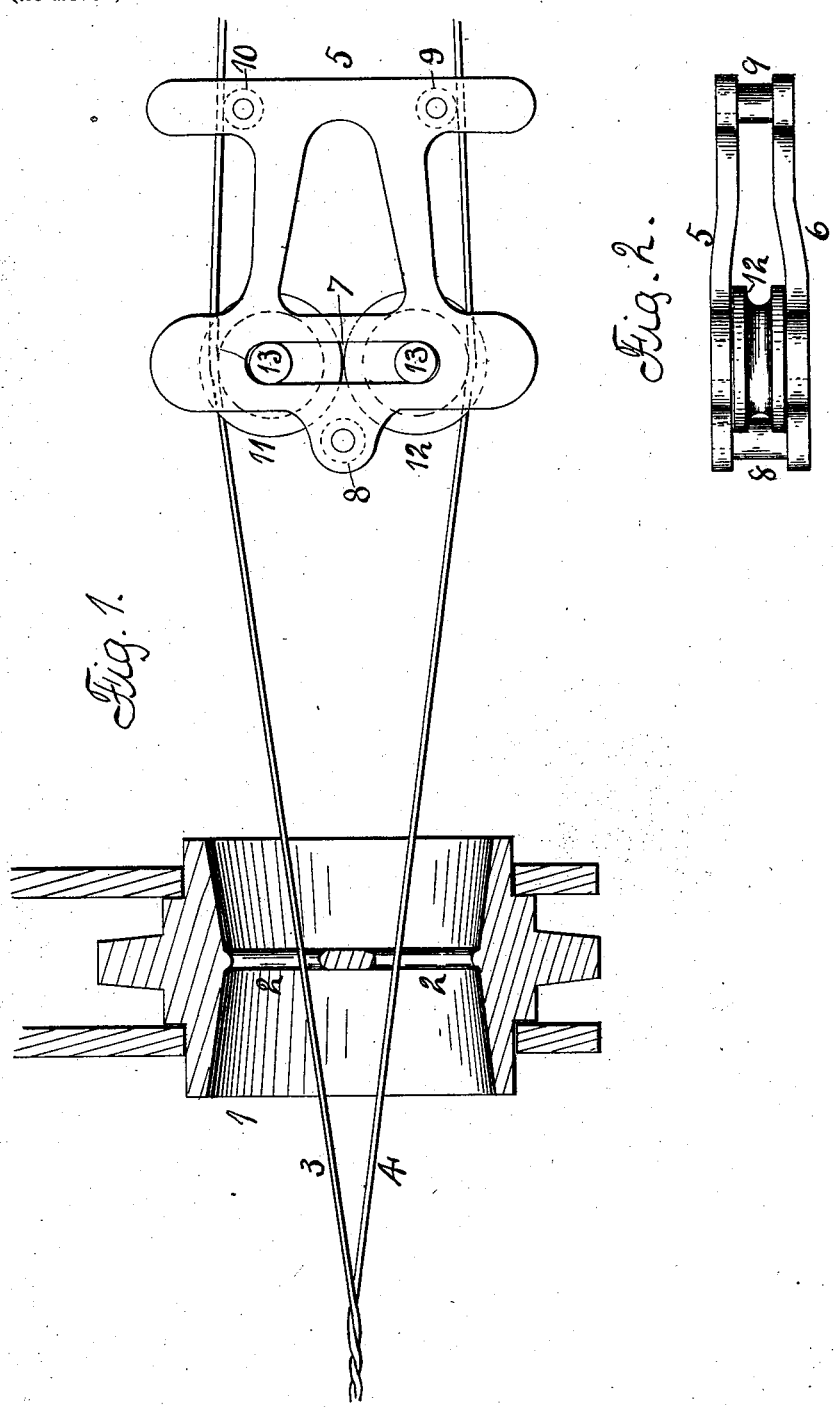
Witnesses:
James J. Cox
E. Behel
Inventor:
Walter C. Kincaid
By A. O. Behel
Atty.

UNITED STATES PATENT OFFICE.

WALTER C. KINCAID, OF MOBERLY, MISSOURI.

SPREADER FOR FENCE-MAKING MACHINES.

SPECIFICATION forming part of Letters Patent No. 699,190, dated May 6, 1902.

Application filed September 30, 1901. Serial No. 77,106. (No model.)

*To all whom it may concern:*

Be it known that I, WALTER C. KINCAID, a citizen of the United States, residing at Moberly, in the county of Randolph and State of Missouri, have invented certain new and useful Improvements in Spreaders for Fence-Making Machines, of which the following is a specification.

The object of this invention is to provide a spreader for the wires in the manufacture of wire fencing; and it consists of a spreader which is supported by the wires before they are twisted and which will maintain about a certain distance from the twister-heads.

In the accompanying drawings, Figure 1 is a representation of the spreader and a section of the twister-head. Fig. 2 is an edge view of the spreader.

The twister-head 1 is of an old construction and provided with the openings 2, through which the wires 3 and 4 pass.

My improved spreader consists of the two plates 5 and 6, each provided with a slot 7. The plate 6 has three studs 8, 9, and 10 formed therewith, their ends being reduced and passing through openings in the plate 5 and riveted in place, thereby connecting the plates. Two grooved rollers 11 and 12 are located between the plates, and trunnions 13 extending therefrom are located in the slots 7, which form a pivotal support for the rollers. This spreader is placed in connection with the wires 3 and 4, from which the fence is made, and in advance of the twister-head, the wires engaging the grooved rollers and the studs 9 and 10, which serve as guides for the wires. The wires are twisted together at the opposite side of the head to that at which the spreader is located. The distance between the twister-head and spreader is determined by the angle of the wires between these points, and as the machine advances along the wires during the twisting process the spreader will keep ahead by reason of the wires closing in on the rollers and no attention need be paid the spreader. In this instance I have permitted the rollers to revolve in contact, thereby taking the friction from the trunnions.

I claim as my invention—

A spreader for portable wire-fence-making machines comprising two plates held separated, each having a slot and four projecting lugs, two groove-faced rollers located between the plates and having trunnions located in the slots the rollers being held in contact by the pressure of the fence-wires.

WALTER C. KINCAID.

Witnesses:
A. O. BEHEL,
E. BEHEL.